Nov. 21, 1939. W. C. HUEBNER 2,180,417
MEANS FOR PHOTOGRAPHICALLY COMPOSING TYPE CHARACTERS
Filed Jan. 22, 1937 11 Sheets-Sheet 4

FIG.4.

INVENTOR
William C. Huebner
BY Joseph Harris
ATTORNEY

Nov. 21, 1939.  W. C. HUEBNER  2,180,417
MEANS FOR PHOTOGRAPHICALLY COMPOSING TYPE CHARACTERS
Filed Jan. 22, 1937  11 Sheets-Sheet 5

INVENTOR
William C. Huebner
BY Joseph Harris
ATTORNEY

Fig. 15

Nov. 21, 1939.   W. C. HUEBNER   2,180,417
MEANS FOR PHOTOGRAPHICALLY COMPOSING TYPE CHARACTERS
Filed Jan. 22, 1937   11 Sheets-Sheet 9

INVENTOR
William C. Huebner
BY Joseph Harris
ATTORNEY

Fig. 21

Patented Nov. 21, 1939

2,180,417

UNITED STATES PATENT OFFICE 2,180,417

MEANS FOR PHOTOGRAPHICALLY COMPOSING TYPE CHARACTERS

William C. Huebner, New York, N. Y.

Application January 22, 1937, Serial No. 121,780

10 Claims. (Cl. 95—4.5)

This invention relates to improvements in means for photographically composing type characters.

One object of the invention is to provide apparatus for accurately and without distortion, photographically composing, in any desired arrangement, on a member provided with a light sensitive coating, images of readable, photographable characters, herein referred to as type or printing characters for convenience and simplicity, whereby, after the light sensitive medium has been so photographically impressed with the desired arrangement of characters, a printing surface may then be prepared therefrom by any of the known methods to the end that the improved means are adapted to replace the present day orthodox type setting machines employing the use of hot metal.

Another object of the invention is to provide an improved apparatus for accurately photo composing display type, such as large newspaper ads, in any desired arrangement and size of the type matter.

A further object of the invention is to provide an apparatus of the character indicated in the two preceding paragraphs which is characterized by simplicity of construction, minimum number of parts, absence of distortion, color fringes or chromatic aberration, and assurance of true alinement of the composed type matter and accurate positioning of each character.

Still another object of the invention is to provide an apparatus of the character indicated in the preceding paragraphs such that each of the characters, which it may be desired to reproduce, may be selectively, optically projected, in any desired sequence, into focused and predetermined position to a common master position in a focal plane and the images thereof photographically reproduced on a negative or other member having a light sensitive coating thereon.

Another object of the invention is to provide an apparatus in accordance with the preceding paragraphs wherein the images or any desired ones thereof, as photographed, may be enlarged, reduced, or made the same as the corresponding originals.

A specific object of the inventtion is to provide an apparatus embodying a series of the desired type or printing characters, each of which is incorporated onto a master character plate or member in predetermined position and location thereon, and with which master character plate is associated, one for each character thereon, light controlling means, an optical or projecting device, the light controlling means being selectively operable to control the light passage, by any suitable means, such as manually operated keys, or automatically by perforated rolls, the optical features of each device being so arranged that all of the character images are projected uniformly and in a like manner to a single master position.

Still other specific objects of the invention are: to provide a plurality of series of characters, any one of which series may be selected at any time during the composing operation for reproduction; to so arrange the apparatus as to provide for ready interchangeability of the master character member to thereby allow of selection of any desired font or fonts of type; to provide means for photographically enlarging or reducing the reproduced characters; and to so arrange the parts of the apparatus as to provide for ready accessibility of parts to facilitate adjustments, repairs and cleaning.

Other objects of the invention will more clearly appear from the description and claims hereinafter following.

In the drawings forming a part of this specification.

Referring first to the construction illustrated in Figures 1 to 10, the improved apparatus is shown as comprising a supporting base A; a front housing B mounted thereon; and a second rear housing C also mounted on the base A.

As shown, the base A is of generally rectangular outline, the same being provided with guideways 30—30, with which cooperate laterally extended guide flanges 31 carried at the bottom end of the housing B. The housing B is provided with a rack 32 at the bottom thereof with which cooperates a pinion 33 mounted on a transversely extending shaft carrying an operating knob 34 at its outer end and by which the housing B may be adjusted back and forth, as will be apparent.

The housing C is similarly mounted on the base A and adapted to be adjusted back and forth by means of the rack 35, pinion 36 and knob 37, as shown. The housing C is preferably provided with a forwardly extended flange 38 which telescopes over the rearwardly extended wall 39 of the housing B and a light sealed joint maintained between the telescoped housings by any suitable means, such as the felt or other washer 40. As will be apparent from the preceding description, the two housings B and C may be adjusted relatively toward and from each other, within reasonable limits, to provide for the necessary focusing of the projected images, as hereinafter described.

Figure 4:
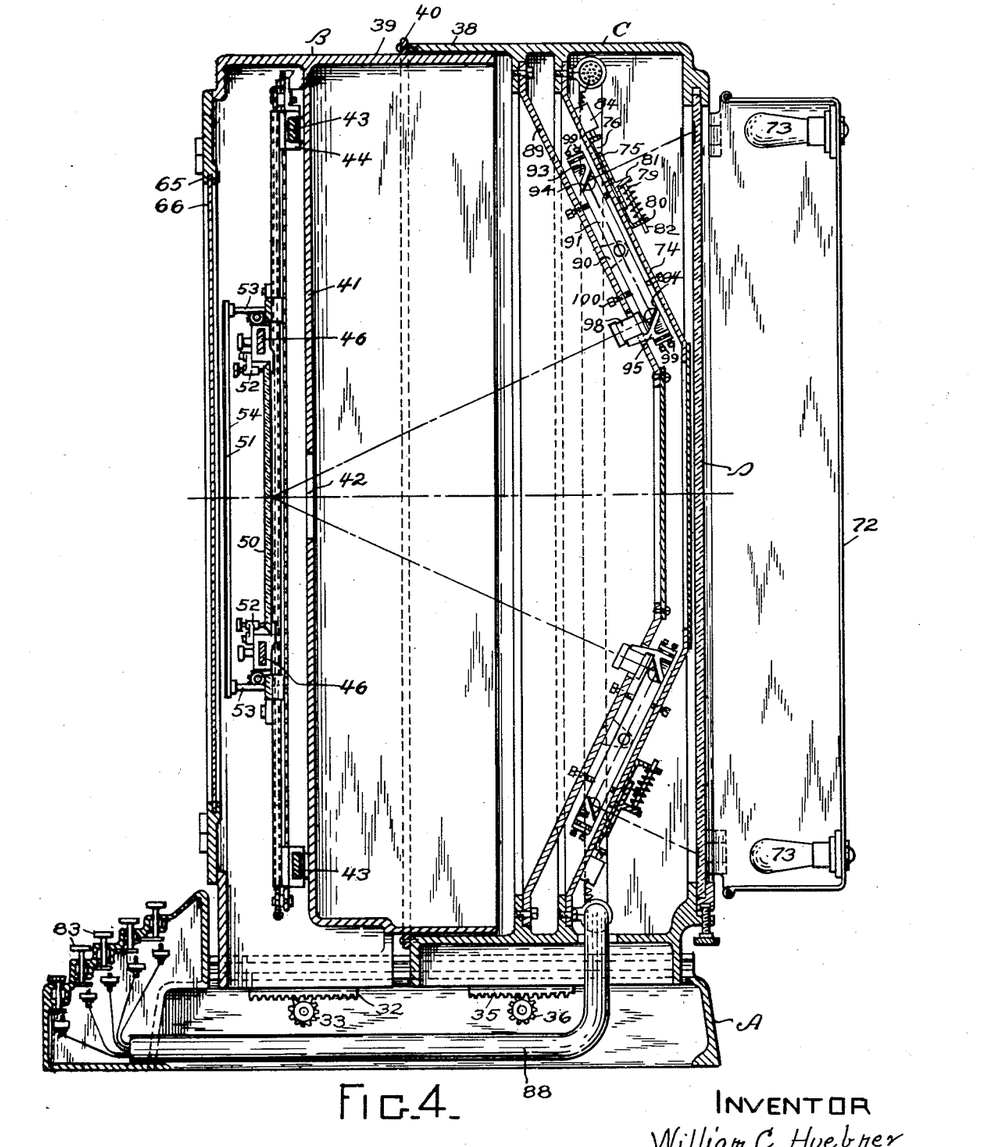
Figure 4 is a vertical sectional view corresponding substantially to the line 4—4 of Figure 1.

The housing B is provided with an intermediate vertical partition 41 having a light opening 42 in the center thereof, as shown in Figure 4. Fixed to the front side of the partition 41 are two horizontally extending upper and lower guide rails 43—43 on which is horizontally adjustable, a rectangular framework carriage 44, the latter having vertical side guide bars 45—45. Vertically adjustable on the side guide bars 45 is a second rectangular framework comprised of upper and lower horizontal bars 46—46 and side racks 47—47. Each of the horizontal bars 46 carries a transversely extending shaft 48 provided with pinions 49 which cooperate with the racks 47 so that the vertical spacing between said bars 46 may be varied to accommodate negatives 50 or other mediums provided with light-sensitive coatings and layout sheets 51 of different sizes. The glass negative 50 is adapted to be rigidly secured in place by suitable clamps 52—52, horizontally adjustable on the respective bars 46 to accommodate negatives of different widths. The layout sheet 51 is supported from the bars 46 in outwardly spaced relation to the negative 50 by any suitable means, such as the posts 53—53 to which is secured a transparent supporting plate 54 and on which the layout sheet is adapted to be pasted down or taped, as will be understood.

Figure 1:
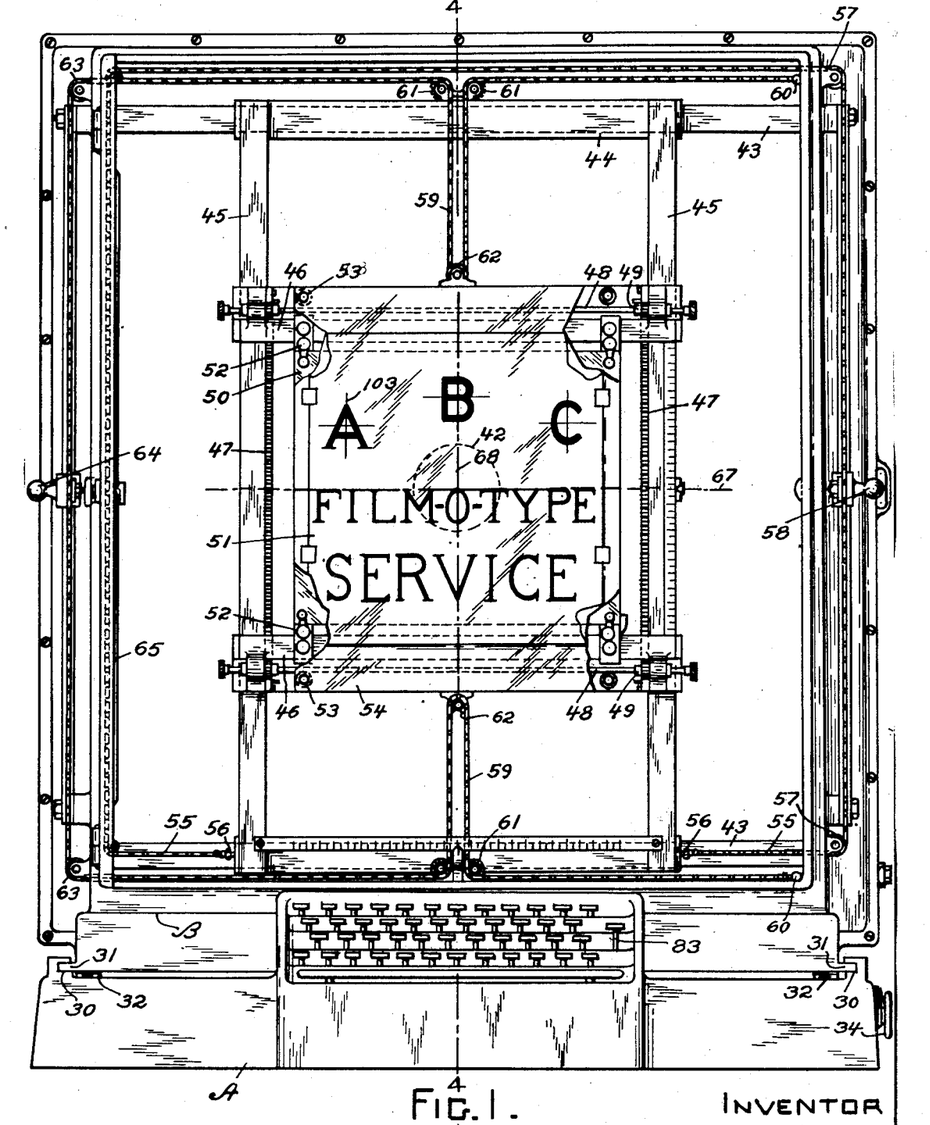
Figure 1 is a front elevational view, with the front holding frame removed, of one form of apparatus embodying the invention.
Figure 2:
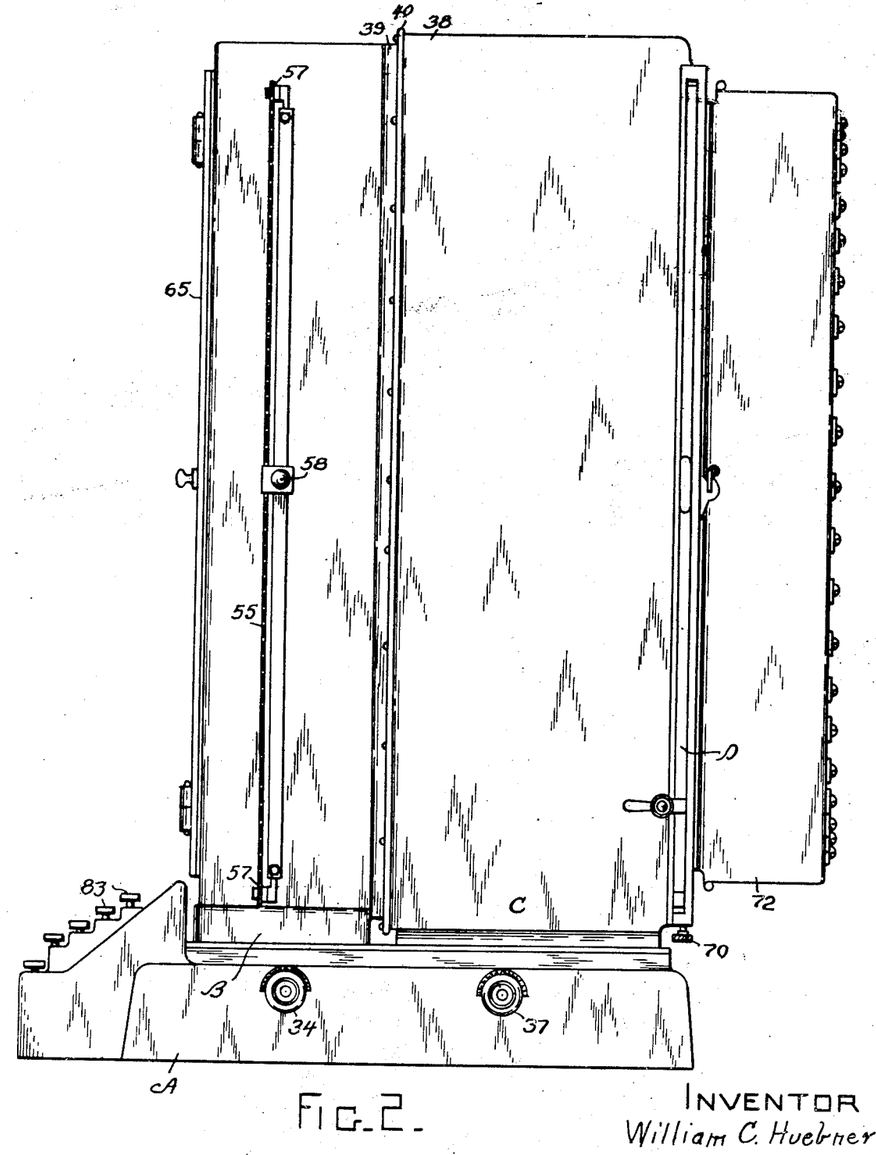
Figure 2 is a side elevation of the structure shown in Figure 1.

In the particular embodiment of the invention shown, the supporting means for the negative and layout sheet are adapted to be adjusted manually both vertically and horizontally in a vertical plane, the means provided therefor being as follows. To adjust the main carriage frame 44 horizontally on the guide bars 43, a sprocket chain 55 has its ends attached to said carriage at the opposite sides thereof at the bottom as shown at 56, said sprocket chain passing over idlers 57—57 near the four corners of the housing B. Secured to said chain 55 at one side of the apparatus is a handle or knob 58 so that, by moving the knob 58 up or down, the main carriage frame 44 may be adjusted horizontally to the right or left, as will be evident. The sub-carriage 46, 47 is vertically adjusted on the main carriage 44 by means of another sprocket chain 59 having its ends secured to one side of the housing B as indicated at 60—60 and which passes over idlers 61—61 on the main carriage 44, idlers 62—62 secured to the top and bottom of the sub-carriage 46—47, and idlers 63—63 at the left hand side of the housing B, as shown in Figure 1. The chain 59 carries a similar handle or operating knob 64 accessible at the left hand side of the apparatus so that, by adjusting said knob 64 up and down, corresponding movements are imparted to the sub-carriage 46—47.

At the front of the housing B is provided a hinged rectangular frame 65 which carries a glass plate 66 on which are scribed two lines at exactly right angles to each other and which intersect at the center opposite the center of the light opening 42. The position of said lines is indicated by the dot and dash lines 67—68 of Figure 1, and said lines determine what may be called the master position lines of the particular apparatus being described. As will be apparent, so long as the pivoted door 65 is closed and locked to the housing B, said master position lines 67—68 will always maintain a fixed relation to the housing B and to the light opening 42 for the purpose hereinafter described.

Figure 3:
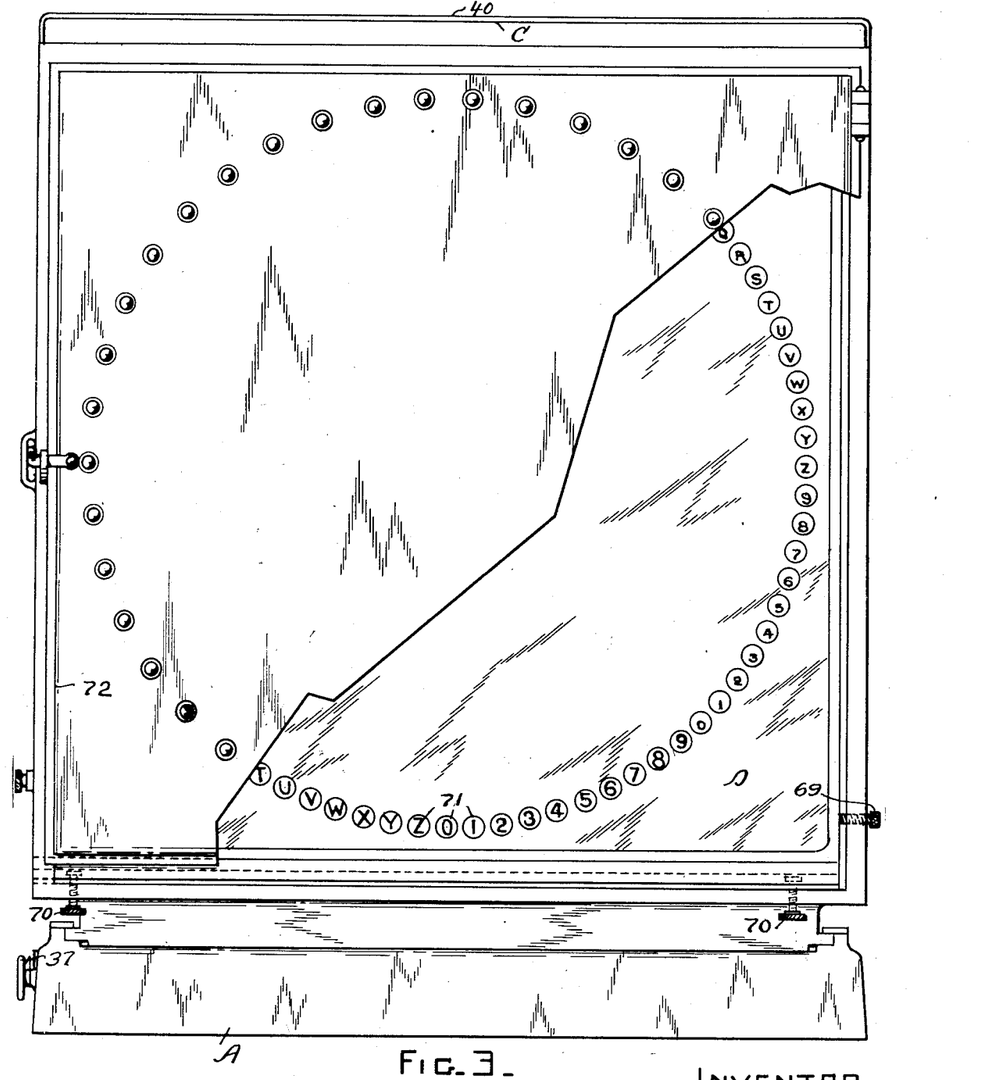
Figure 3 is a back elevational view, parts being broken out, of the master character plate and associated framework.

Detachably mounted in the housing C, at the rear thereof, is the master character plate designated generally by the reference character D. Said plate D, as shown, is preferably of rectangular outline and, as best shown in Figures 3 and 4, is adapted to be accurately positioned and centered with reference to the housing C by suitable horizontal edge adjusting screws 69 and vertical edge adjusting screws 70. Said master character plate D has incorporated thereon, and arranged in a circular series in a flat field, all of the characters which it is desired to use in the composing operation. By the term "characters", as used throughout the descriptive portion and claims hereof, is intended to be included letters of the alphabet, numerals, punctuation marks and other type signs and symbols such as commonly used in the printing art and sufficient in number to constitute what is hereinafter termed a "font" for practical printing composing operations. In Figure 3 are shown portions of two alphabets of different case size and likewise two series of numerals of different size, said characters being referenced 71—71. Each of the characters incorporated on the master character plate D is positioned and located thereon in an accurately predetermined location and position such that, when the image thereof is optically projected, as hereinafter described, the reproduced image will occupy a predetermined position and location with reference to the master position lines 67 and 68, hereinbefore referred to. As shown, all of said characters 71 in the circular series are disposed "head-up", that is, vertically with reference to the horizon when the master character plate itself is in vertical operative position as best illustrated in Figure 3. Said characters 71 may be incorporated on the plate D in any suitable manner, but preferably photographically, and the character outlines themselves will be either opaque or transparent, dependent upon whether the main body of the character plate D is transparent or opaque.

Hingedly secured to the rear wall of the housing C is a lamp casing 72 carrying preferably a circular series of electric light bulbs 73 disposed substantially in line with the circular series of characters 71 so as to thereby obtain full illumination of the characters as will be understood.

Disposed within the housing C in front of the master character plate D is a partition 74 of what may be termed truncated cone formation. On said partition 74, preferably on the side adjacent the character plate D, is a circularly arranged series of light shutters, one for each of the characters on the plate D. Said shutters are best shown in detail in Figs. 5 and 6 and, as there shown, each is constructed as follows. Secured to the partition 74 is a radially extending guide plate 75 between which and the partition 74, is slidably mounted the shutter proper 76. Each guide plate 75 is provided with a light passage opening 77 and directly in line therewith, the partition is similarly apertured. The shutter 76 is also provided with a corresponding light passage opening 78. The shutter 76 is normally held in retracted position as shown in the upper shutter arrangement shown in Fig. 5 by means of a coil spring 79 interposed between an upstanding flange 80 on the shutter and a flange 81 formed on the guide plate 75. To maintain the position of the spring 79, the same may be mounted on a guide pin 82 fixed to the flange 81 and slidable through the flange 80. As will be evident from Figure 5, when the shutters 76 are in retracted position, the openings 77 in the guide plates and corresponding openings of the partition 74 are closed, thereby preventing passage of light from the characters through the partition but, when the shutters are moved to open position, as shown in the sectional view of Figure 6, light may pass through all of the three alined openings to the optical elements, hereinafter described.

Figures 5, 6, 7, 11, 12, 13:
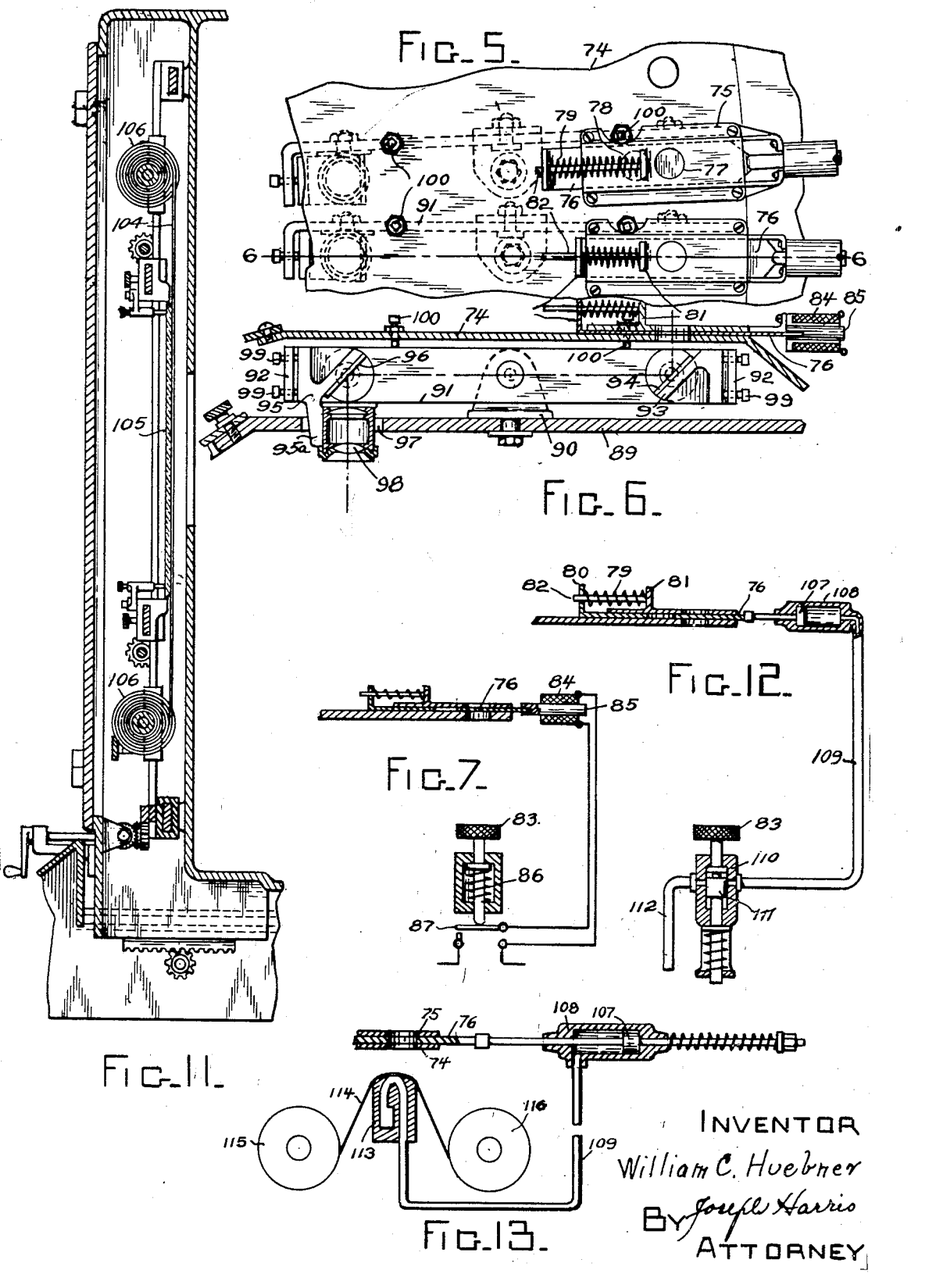
Figure 5 is a broken detail view illustrating more particularly the shutter mechanism and associated optical or projecting devices.
Figure 6 is a sectional view corresponding substantially to the line 6—6 of Figure 5.
Figure 7 is a schematic view illustrating the means for controlling the shutters.
Figure 11 is a broken, vertical, sectional view similar to Figure 4, illustrating a modification embodying a roll of film onto which the images are adapted to be projected.
Figure 12 is a schematic view, similar to Figure 7, illustrating a modified means of controlling the shutters manually by pneumatic action.
Figure 13 is another schematic view illustrating means for automatically operating the shutters by means of a perforated roll and suction arrangement.

For selectively operating the shutters of the several characters, any suitable means may be provided, but preferably in the type of apparatus shown in Figures 1 to 4, by a bank of keys 83, one for each character similar to a typewriter keyboard, said keys being preferably located at the front of the machine as shown. A suitable electrical means for individually operating each of the shutters is illustrated best in Figures 6 and 7. As there shown, each guide plate 75, at its outer end, carries a solenoid 84 with which cooperates a solenoid plunger 85 secured to the outer end of the shutter proper 76. Each character key 83, as illustrated in Figure 7, is preferably normally yieldably held in uppermost position by a suitable spring 86 and, upon depression of the key, the same is adapted to close a switch 87, thus closing the circuit to the corresponding solenoid arrangement and thus pulling out the shutter so as to uncover the light openings, as will be understood. There will be a separate circuit with switch included therein, for each of the shutters, all of the wires being carried from the keyboard to the housing C and respective solenoids through a flexible cable 88.

Directly in front of the partition 74, the housing C is provided with a second supporting partition 89 also of what may be termed truncated conical formation. Mounted on said partition 89 is a series of optical or projecting devices, one for each of the characters on the master character plate D and each optical or projecting device directly cooperating with the corresponding shutter device. As best shown in Figures 4, 5 and 6, each said device is preferably constructed as follows. Carried by the partition 89 is a right angular bracket 90 to which is pivotally mounted, intermediate its ends, a plate 91 having right angular flanges 92—92 at each end thereof. Carried by said plate 91, at the right hand end thereof as viewed in Figure 6, is a block 93 on which is provided a mirror 94 disposed at an angle of 45° to the axis of the shutter openings as shown. Similarly, at the other end of the plate 91, is provided a block 95 having a mirror 96 thereon arranged parallel to the mirror 94. The block 95 is additionally provided with an arm 95a extending freely through an adjacent opening 97 in the partition 89 and which arm 96 carries an adjustable vocusing lens 98, the axis of which extends at 45° to the mirror 96. By means of the adjusting screws 99 at each end of the plate 91, it is evident that the spacing and angularity of the mirror blocks can be accurately adjusted for each optical device. Furthermore, by means of the adjusting screws 100—100, the carrying arm 91 may be accurately angularly adjusted with respect to its pivotal support on the bracket 90 to thereby insure absolute accuracy in adjustment of the reflecting mirrors with reference to the respective character and with reference to the master image lines, hereinbefore referred to.

Figure 8:
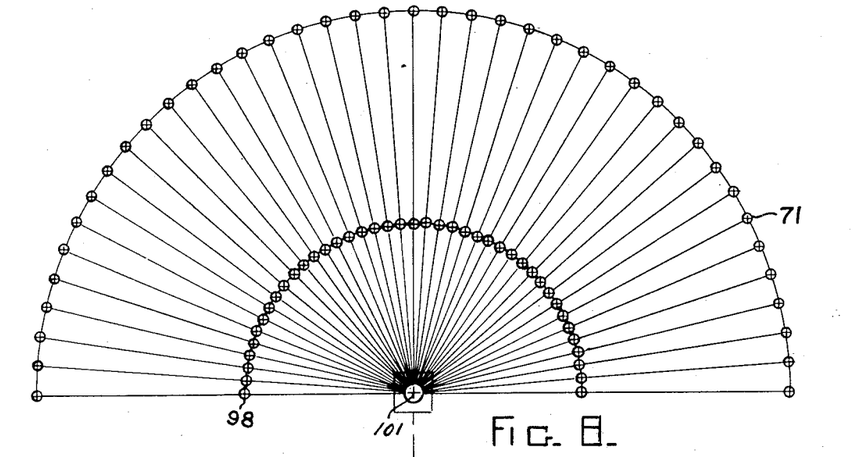
Figure 8 is a diagrammatic view illustrating more particularly the manner of arranging the characters on the master character plate and relation thereof to the optical devices and master image position.
Figure 9:
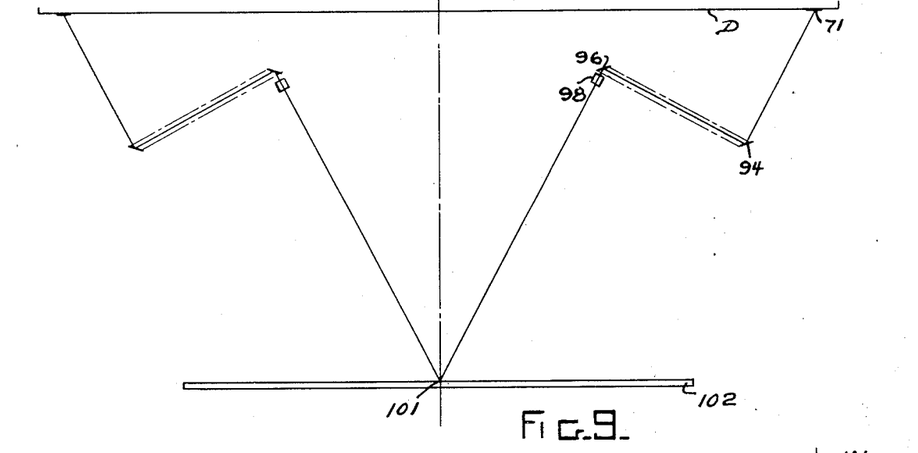
Figure 9 is a diagrammatic view projected in a horizontal plane corresponding to Figure 8 and illustrating the manner of reflecting and focusing the images of the characters to a common master focal point.
Figure 10:
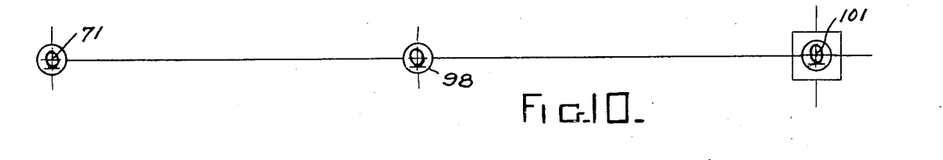
Figure 10 is a diagrammatic view also illustrating the manner of reflecting and focusing the character images.

Referring now more particularly to Figures 8, 9 and 10, it will be seen that, when the shutters for the respective characters 71 are opened, the images from said characters will first be reflected by the corresponding mirrors 94 to the mirrors 96 and from the latter to and through the lenses 98. As clear from a study of the drawings, the axes of all of said lenses 98 converge to and pass through a common point herein called the master position or focal point and which is indicated at 101. Said point 101 obviously lies in a line normal or perpendicular to the master character plate D and passing through the center of the circular series of printing characters. By reason of the circular arrangement of the printing characters on the master character plate, the corresponding circular arrangement of the mirrors and lenses, and the converged lens axes all of the characters of the entire series will have their images all projected into focus at said common or master position or focal point indicated at 101 in Figure 9. This common focal point or master position may be either on the sensitized element direct, as indicated in Figure 4 or it may be on a focus glass as indicated conventionally at 102 in Figure 9 and which also corresponds to the focus glass 102 in Figure 14, hereinafter referred to. As will be evident, by the proper locating and positioning of the respective characters on the master character plate D and the proper adjustment of the optical devices for each character, the images will all be projected in register and in alinement and in proper position at the one common focal point or master position. It will further be observed that this exceedingly important result is accomplished selectively for all of the characters and in any desired sequence without the necessity of any complicated mechanism; without the necessity of employing movable type characters or moving carriers for type characters; and, in the particular embodiment shown, merely by the simple expedient of utilizing individually controlled shutters for the several characters.

As will further be evident from an inspection of the drawings, particularly Figures 4, 8 and 9, due to the circular arrangement of the characters on the master character plate in a flat field combined with the circular arrangement and conical disposition of the optical devices symmetrically disposed with reference to and around the line normal to the master character plate and passing through the center of the character series, not merely are the images of all of the characters brought to a common focal point, but the paths of travel of all of the images from their respective characters are all alike as regards extent, changing lines of direction and otherwise. Particularly to be noted, is the fact that the paths of projected images from the last element of each optical device to the common focal point, are all of the same extent and uniformly angularly and symmetrically disposed with reference to said line normal to the master character plate and which passes through said common focal point. By reason of the uniform and symmetrical characteristics herein referred to, creation of color fringes or chromatic aberrations or other distortion in the images finally transmitted to the common focal point, is eliminated and, furthermore, all optical devices may be of like construction, composed of easily obtainable parts.

In using the apparatus so far described, with particular reference to display type, the following mode of operation is employed. The layout sheet is first made with each of the letters or characters located thereon in the desired position corresponding to the final copy. Each character on the layout sheet is preferably marked with register lines, as indicated at 103 for the letter A and as also shown for several of the other characters on the layout sheet, said register marks locating the center of the respective characters. With the layout sheet secured to its support 54 in front of the negative 50 (and in employing the term "negative", it is to be understood that said term is employed broadly to include negatives or positives or other members having a light sensitive coating thereon), the operator proceeds to adjust the support 54 so that the particular letter thereon which it is desired to reproduce, is brought with its register lines in register with the master register lines 67 and 68 scribed on the glass plate 66. The particular character having been so registered with respect to the master register lines, the corresponding character key is depressed, thus opening the corresponding shutter and thereby allowing the image of said character to be projected onto the negative and the exposure made for the desired period of time. This operation is repeated for each of the characters, each being brought successively in register with the master register lines 67 and 68 and exposures made with absolute assurance that each exposed image will be made on the negative exactly in accordance with the layout sheet.

Referring next to the modification shown in Figure 11, the arrangement is the same as that already described except that a film 104 having a light sensitive coating thereon may be employed, the same being disposed over a supporting plate 105 occupying a position corresponding to that of the negative 50 in the previously described form. The film is carried by rolls 106—106, suitably mounted on the side bars of the main carriage 44 and, as will be evident, when one line of exposures has been made horizontally across the film, the film may be shifted vertically to the next lower line and so on. As will be apparent to those skilled in the art, proper allowance may be made for spacing between words where the photographed matter is letter press and suitable devices may be incorporated for line spacing if desired.

Instead of actuating the shutters by electrical means from the keyboard, the same may be air or vacuum actuated, as indicated conventionally in Figure 12. As there shown, each shutter 76 is provided with a piston 107 working in a cylinder 108 which is connected by a tube 109 to a valve casing 110 in which the valve 111 is adapted to be depressed by the key 83 so as to place the tube 112 in communication with the tube 109. As the arrangement is shown in Figure 12, the operation is by vacuum, it being understood that the tube 112 will be connected to a suitable source of vacuum, such as a vacuum pump and, when the key is depressed, the shutter will be drawn out and the light openings uncovered to permit exposure of the corresponding character.

It is also within the purview of the present invention, to provide for what may be termed automatic actuation of the shutters for making exposures, as illustrated conventionally in Figure 13. In this embodiment, a perforated roll may be employed, previously punched out with the perforations in the desired locations corresponding to the respective characters and spacings desired, similar to the well known music roll. In such cases, the previously prepared perforated roll is inserted into the apparatus and by the successive uncovering of the respective character vacuum tubes, the characters photographed in accordance with the roll. As shown in Figure 13, each shutter 76 is connected through a piston 107 working in a cylinder 108, the cylinder being in communication with a vacuum tube 109 similar to the construction shown in Figure 12. The series of vacuum tubes 109 are all run to a vacuum tracker board 113 over which the perforated roll 114 passes while being unwound from the roll 115 onto the takeup roll 116. As the several vacuum lines 109 are uncovered, the vacuum in the tubes 109 is released, and the shutters actuated, as will be understood. In connection with the perforated roll operation of the shutters, suitable mechanism will be provided for automatically shifting the member having the light sensitive coating thereon horizontally step by step as the characters and spacings are recorded and also automatically shifted vertically for line spacing in those cases where a column of letter press is to be reproduced.

Figure 14:
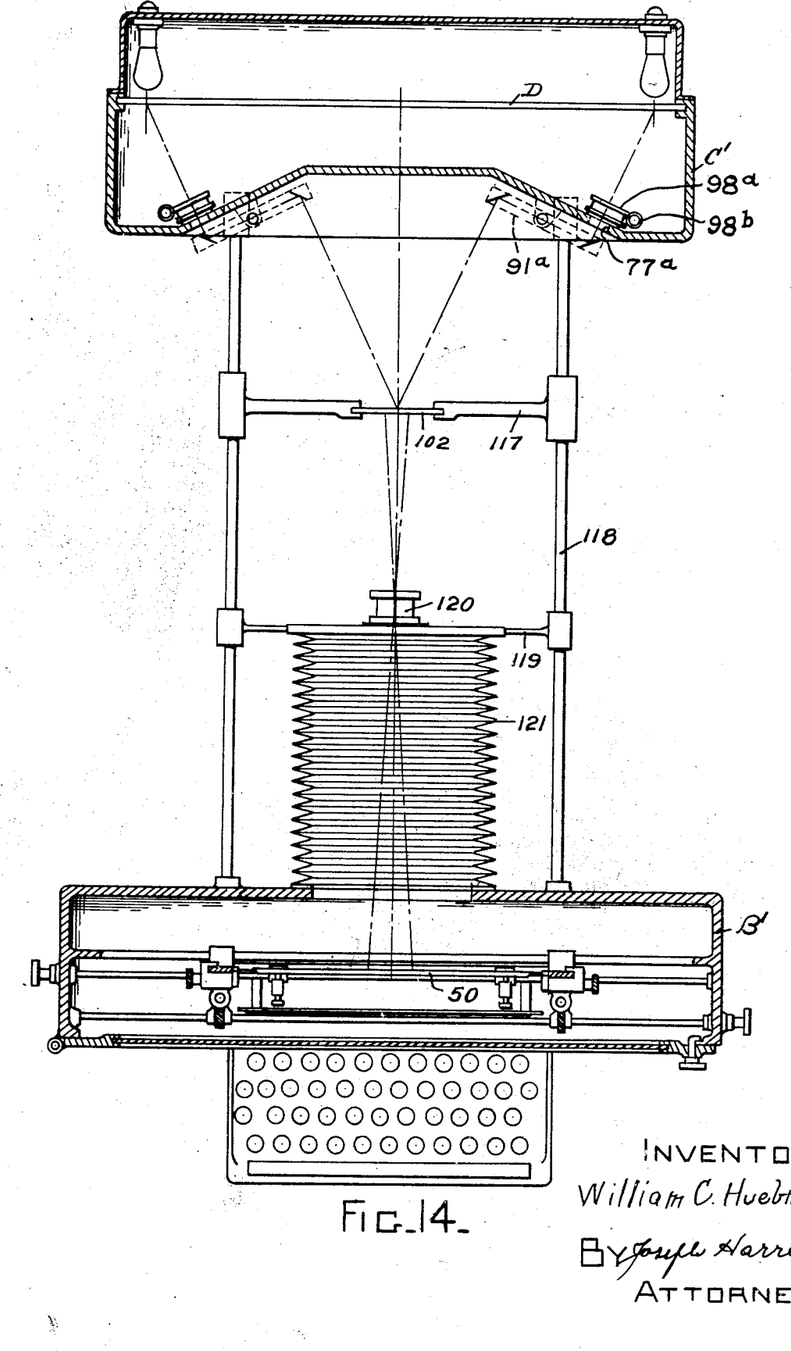
Figure 14 is a horizontal sectional view of a modification of the apparatus shown in Figures 1 to 4, and illustrating an arrangement wherein the reproduced images of the characters may be enlarged or reduced in association with a camera.
Figure 15:
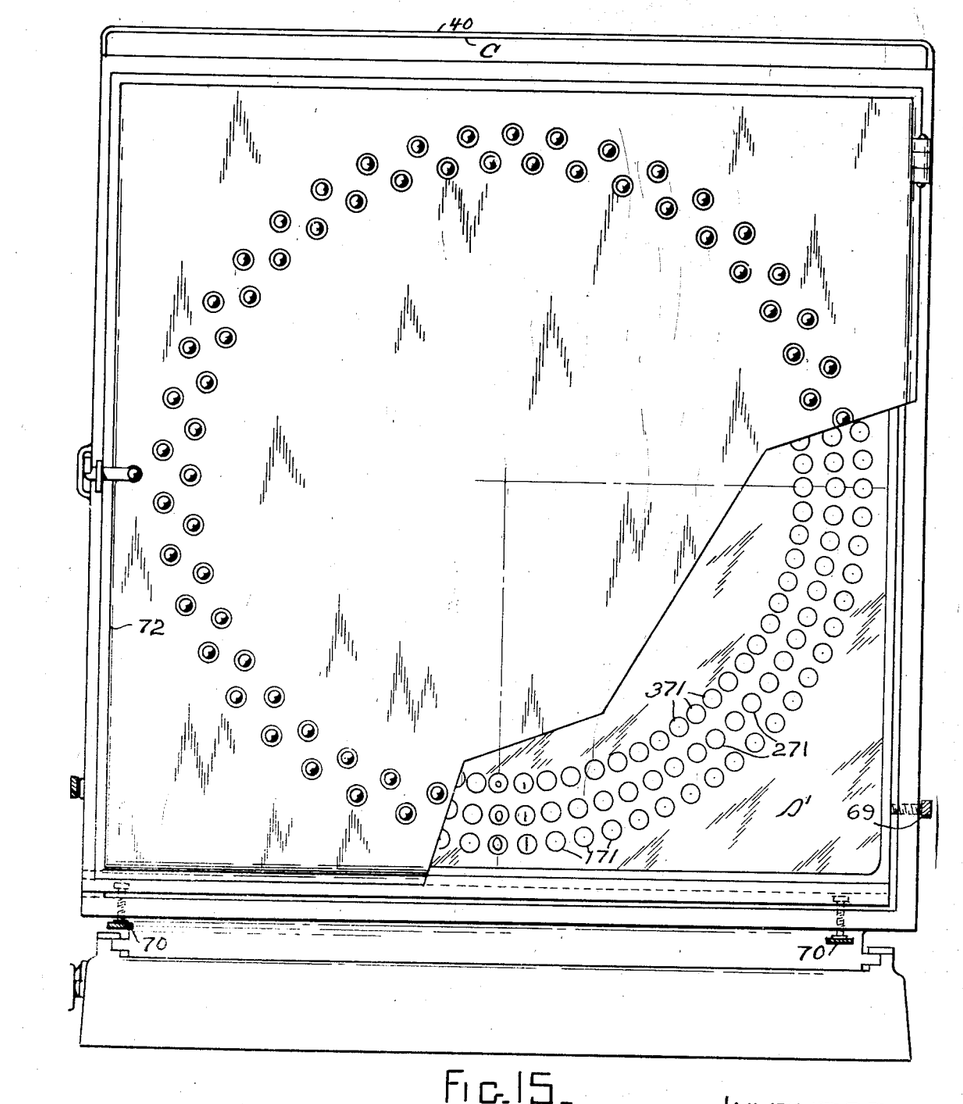
Figure 15 is a view, similar to Figure 3, illustrating a modified form of master character plate embodying a plurality of series of characters of different fonts.

Referring next to the construction illustrated in Figure 14, the general arrangement of master character plate D, keyboard and negative carriages is the same as that previously described. Likewise, the general circular and conical disposition of the optical devices and relation to the master character plate are the same as previously described, but with certain modifications of the optical devices. The arrangement of mirrors for each character to be photographically projected is the same as in the previously described constructions, as indicated by the dotted lines at 91a. Instead, however, of employing a focusing lens adjacent the last reflecting mirror, a camera type of lens is preferably employed, as indicated conventionally at 98a at each opening 77a and preferably on that side of the conical partition facing the master character plate D. The camera type of lens 98a may, as will be obvious, have a suitable shutter as indicated conventionally at 98b. In the construction of Figure 14, the character images are all adapted to be projected onto the focus or ground glass 102, as indicated, said glass 102 being mounted in a framework 117 horizontally adjustable on guide bars 118 which connect the negative housing B' with the optical device housing C'. Also slidably mounted on the guide bars 118 is a second frame 119 carrying a camera projecting lens 120 and between which and the housing B' is disposed the usual bellows 121. As will be evident to those skilled in the art, by the proper adjustment of the projecting lens 120, the reproductions of the characters may be enlarged or reduced as the same are projected onto the negative 50, this arrangement being of particular value in connection with display type composition.

Referring to Figures 15 to 20, the modification there shown contemplates the use of a master character plate having several series of characters of different size or fonts. As shown, the master character plate D' is provided with three series of characters as, for instance, an outer series 171 of upper case, an intermediate series 271 of lower case and an inner series 371 of italics, as specially advantageous in connection with book printing. As will be understood, any number of series may be employed, any desired variety of sizes and any desired fonts. Each of the characters will, as previously described in connection with the master character plate D, be accurately located and positioned in its particular circular series, all will lie in a flat field, and, furthermore, the corresponding like characters of the plurality of series will be arranged on the same radius.

When master character plates are employed utilizing several series of characters of different sizes or fonts, shutter and optical or projecting devices are employed as shown in Figures 16 to 20.

Figures 16, 17:
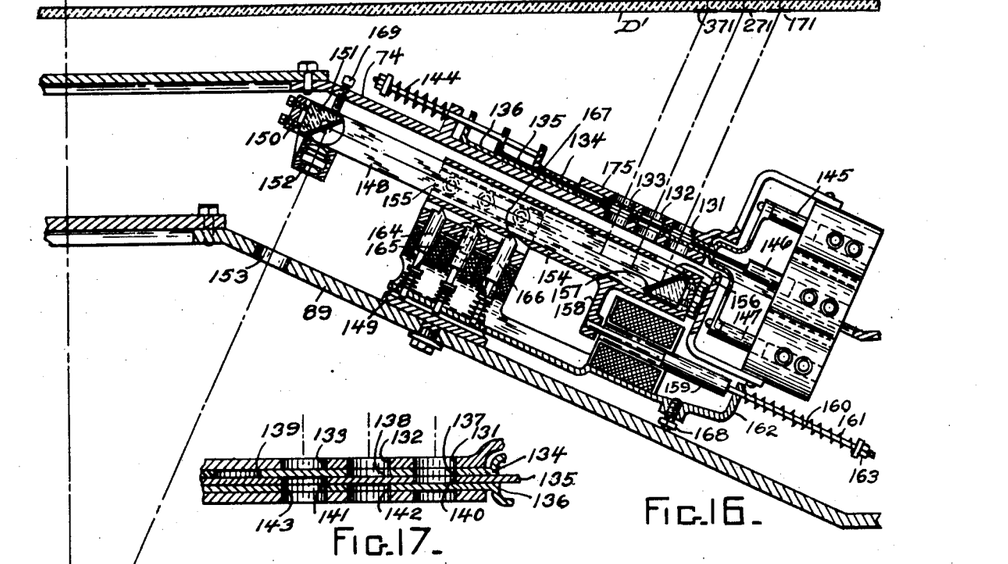
Figure 16 is an enlarged, detail sectional view, similar to Figure 4, illustrating shutter mechanism adapted to be employed with master character plates of the type illustrated in Figure 15.
Figure 17 is an enlarged detail sectional view of the shutter mechanism shown in Figure 16.
Figure 18:
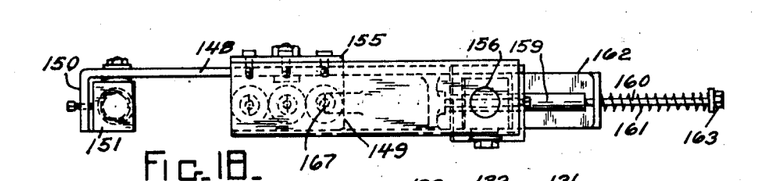
Figure 18 is a side elevational view of the optical or projecting devices employed with the construction illustrated in Figure 16.

Mounted on the partition 74 of the apparatus is a multiple shutter device for each corresponding set of like characters, as for instance the upper case, lower case and italic letter O. Each of said multiple shutter devices comprises a guide plate 175 having three radially arranged light passage openings 131, 132 and 133 corresponding, respectively, to the outer, intermediate and inner series of characters. The partition 74 is provided with three corresponding light passage openings alined respectively with the openings 131, 132, 133. Slidably interposed between the guide plate 175 and the partition 74 are three shutters 134, 135 and 136. The uppermost shutter 134 is provided with three openings 137, 138 and 139, the openings 137 and 138 being normally alined with the guide openings 131 and 132, respectively. The third opening 139, as best shown in Figure 17, is disposed inwardly of the guide opening 133 so that the latter is normally closed by the shutter 134. The intermediate shutter 135 is provided with two openings 140 and 141 normally alined with the guide openings 131 and 133, respectively, so that the center guide opening 132 is normally closed by the intermediate shutter 135. The innermost shutter 136 is provided with two openings 142 and 143 normally alined with the guide openings 132 and 133 so that inner shutter 136 normally closes off the guide opening 131.

Figures 19, 20:
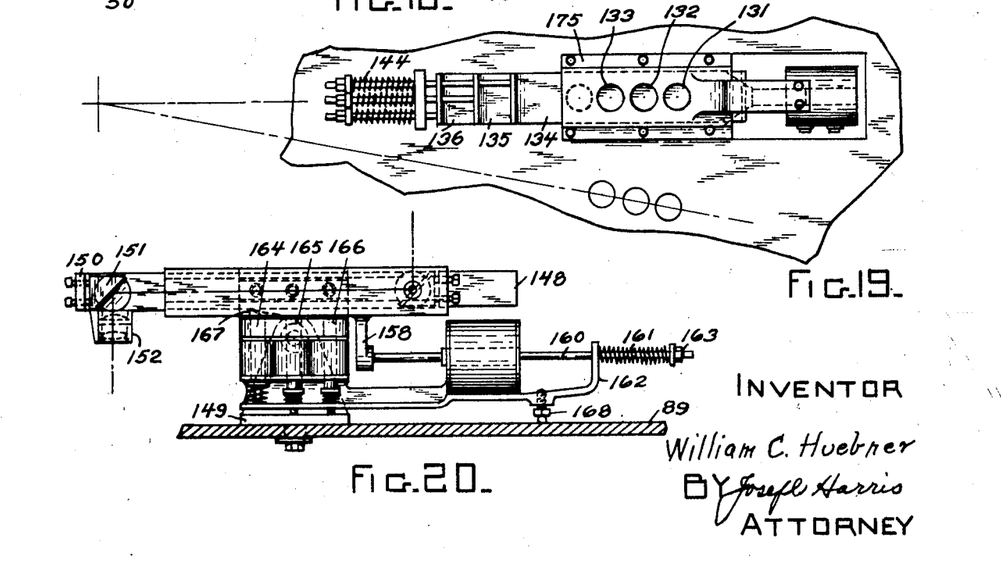
Figure 19 is a plan view of the structure shown in Figure 16.
Figure 20 is a side elevational view of the structure shown in Figure 18.

Each of the shutters 134, 135 and 136 is held in its normal closed position by a suitable spring 144 as illustrated in Figure 19 and, at its outer end, each shutter is also provided with a solenoid, the same being indicated respectively at 145, 146 and 147. The shutters of like characters of all of the series of characters are adapted to be operated by the same character key, that is, the shutter for the letter O, for instance, whether in the upper case, lower case or italics, will be operated by the one "O" key. The proper shutter for the desired character of the desired series is selectively determined by means of a "series" key somewhat similar to the shift key of a typewriter, that is, if the upper case "O" is to be uncovered, an upper case "series" key will first be actuated to transfer the circuits for all the operating keys to all the upper case solenoid shutters which, in the particular construction shown best in Figure 17, are the innermost shutters 136. Upon depressing of the upper case series key and thereafter the key of the desired character of the upper case series, the respective innermost character shutter 136 will be drawn out by its corresponding solenoid 147, thereby completely uncovering the opening 131 and permitting the light to pass therethrough to be projected as hereinafter described. Similarly, when photographing a character of the intermediate series, the corresponding intermediate "series" key will be depressed and when a character key is depressed, the respective intermediate character shutter 135 will be drawn out, thus completely uncovering the opening 132. A similar operation is employed for uncovering the innermost or italic series of characters by operating the shutters 134.

In addition to selecting the proper shutters for the particular series of characters being photographed, it is likewise necessary to obtain the proper adjustment, disposition, or selection of the optical devices which is accomplished by the following mechanism, it being understood that there is one set of optical or projecting devices for each set of like characters of the several series, in the apparatus now being described. Each said set of optical devices comprises a plate 148 pivotally mounted intermediate its ends on a bracket 149 carried by the partition 89. At its inner end, said plate 148 is formed with a right angular flange 150 and carries a mirror block 151 and an adjustable focusing lens 152, the latter being disposed opposite an opening 153 in the partition 89.

Slidably mounted on the plate 148 is a sleeve 154, preferably supported by roller bearings 155 carried by the plate 148. Said sleeve 154, at its outer end, is provided with a light passage opening 156 opposite which, on the interior of the sleeve, is a reflecting mirror 157, it being understood that the mirrors 157 and 151 are disposed parallel to each other and at 45° to the axes of the openings of the shutter mechanism, as described in connection with the first form of the invention.

The sleeve 154 is provided with an arm 158 carrying a solenoid plunger 159 and an extension pin 160. The latter carries a spring 161 interposed between the relatively fixed bracket 162 and a nut 163 on the end of the pin so as to normally hold the sleeve 154 in its outermost position, that is, with the mirror 157 alined with the outermost shutter opening 131.

Carried by the plate 148 are three magnetically controlled stops or plungers 164, 165 and 166 arranged in a radial series and each of which is adapted to selectively cooperate with a shoulder or stop 167 on the bottom side of the sleeve 154. As shown in Figure 16, the plunger 166 is in engagement with the shoulder 167, that is, when the sleeve 154 is in its outermost position. In Figure 20, the sleeve 154 is shown in its innermost position, in which instance, the plunger 164 is in engagement with the shoulder 167.

Similar adjustments for the two mirrors to regulate the spacing therebetween are employed, as previously described, and corresponding adjusting means in the adjusting screws 168 and 169 are employed for adjusting the angularity of the entire optical device, as shown in Figures 16 and 20.

As shown in Figure 16, the optical device is in position to effect photographing of a character of the outer or upper case series. When it is desired to photograph a character from the intermediate or lower case series, actuation of the corresponding intermediate or lower case "series" key, as described in connection with the shutter mechanism, will simultaneously energize all of the solenoids 159 to pull the sleeve 154 inwardly or toward the left, as viewed in Figure 16, and simultaneously energize all of the solenoids for the two series of plungers 164 and 166, but leaving the solenoids for the center series of plungers 165, unenergized, so that said intermediate plungers 165, under the influence of their corresponding springs, are adapted to move upwardly and engage the sleeve shoulders 167 and thereby limit their outward movements, under the influence of the springs 160, when the solenoids 159 are deenergized. In this manner, all of the mirrors 157 are brought in alinement with the intermediate or lower case shutter openings 132 so that, when any character shutter of the lower case series is actuated, the respective character of the lower case series is adapted to be reflected from the corresponding mirror 157 to the mirror 151 and thence through the lens to the master position in the focal plane. A similar operation occurs when the innermost or italic series of characters is to be photographed, in this instance, the plungers 164 determining the positions of the sleeves 154 and mirrors 157, as illustrated in Figure 20.

From the preceding, it will be seen that the arrangement for composing characters of several different series, is exceedingly compact and relatively simple and that change-overs from one series to any other series may be readily made by a single "series" key, all while the master character plate remains in fixed position. Furthermore, by placing each of the individual characters of all the series on the master character plate in predetermined position and location, each one of the total number of characters has its image projected to the one master position in the focal plane in register and in alinement.

Figure 21:
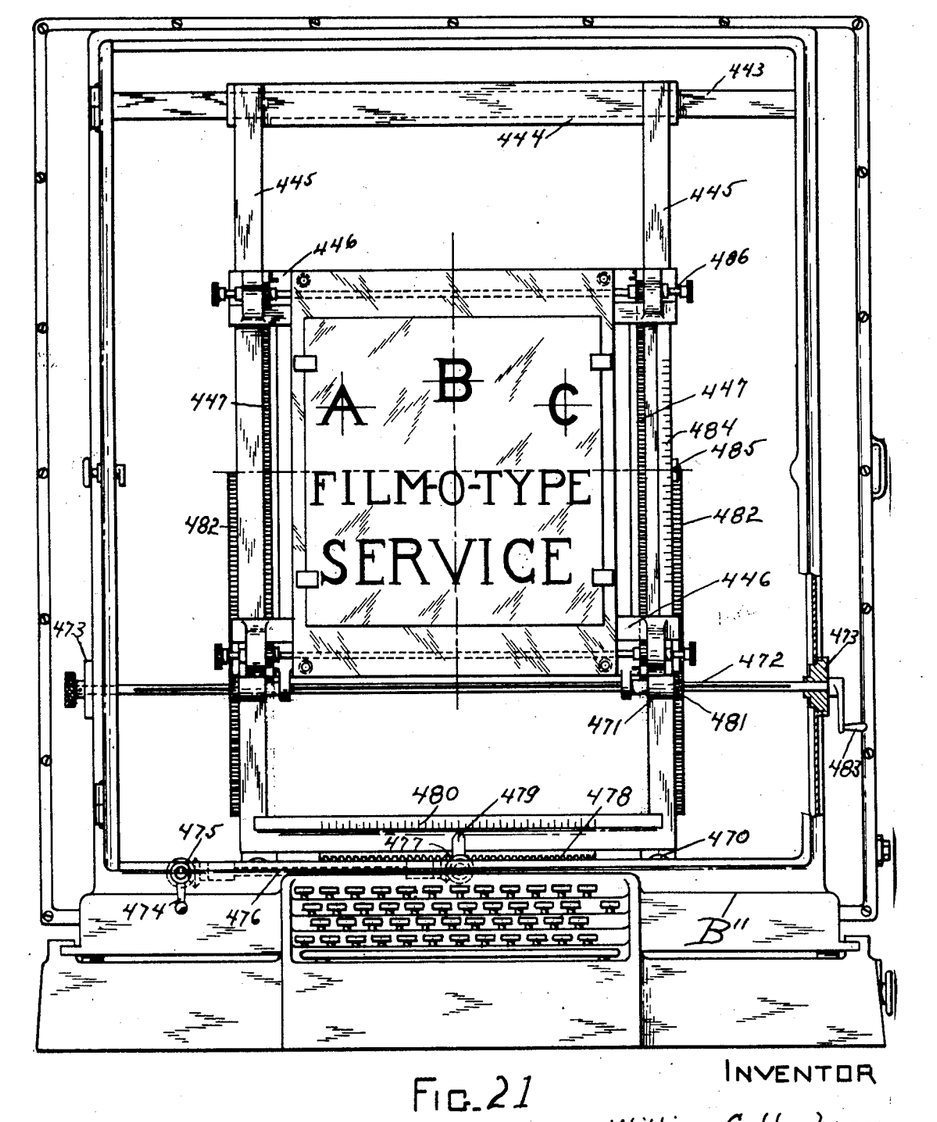
Figures 21, 22 and 23 are modifications of certain details of construction.

Referring to Figure 21, there is shown therein a modification of the sensitized surface carrying arrangement corresponding to the arrangement shown in Figure 1. In said Figure 21, the housing B″ is provided with an upper horizontally extending guide rail 443 and a corresponding lower guide rail, not shown, but on which ride supporting rollers 470 for the main horizontally adjustable framework 444. The latter includes vertical side guide bars 445, on which is vertically adjustable a vertically expansible rectangular framework comprised of upper and lower horizontal bars 446—446 and side racks 447—447. The lower horizontal bar 446 is provided with shaft bearings 471 in which is rotatably journaled a horizontally extending shaft 472 supported at its ends in collars 473—473 which are vertically slidable in corresponding slots in the side walls of the housing B″.

Horizontal adjustment of the main framework or carriage 444, is effected through a crank arm 474, bevel gears 475, horizontal shaft 476, bevel gears 477, the last beveled gear of the train carrying a pinion (not shown) which cooperates with a rack 478 on the bottom bar of the carriage 444. As will be evident, upon rotation of the crank arm 474, the carriage 444 may be adjusted horizontally and its position indicated by the pointer 479 and scale 480.

Vertical adjustment of the sub-carriage, 446, 447, on the main carriage, is effected through pinions 481 journaled in the lower cross bar 446 and splined to the shaft 472. Said pinions 481 cooperate with vertical racks 482 fixed to the side bars 445 of the main carriage. By rotating the crank arm 483 carried at the outer end of the shaft 472, it is evident that the sub-carriage may be adjusted vertically to the desired position and its vertical position indicated by the scale and pointer arrangement 484—485.

For adjusting the vertical dimensions of the sub-carriage to accommodate negatives or films or layouts of different vertical width, the upper and lower cross bars 446 of the sub-carriage are adapted to be separated or moved toward each other by horizontally extending shafts 486 carried by said cross bars 446, said shafts 486 having pinions thereon cooperable with the rack sides 447 of the sub-carriage, as shown.

Figures 22, 23:
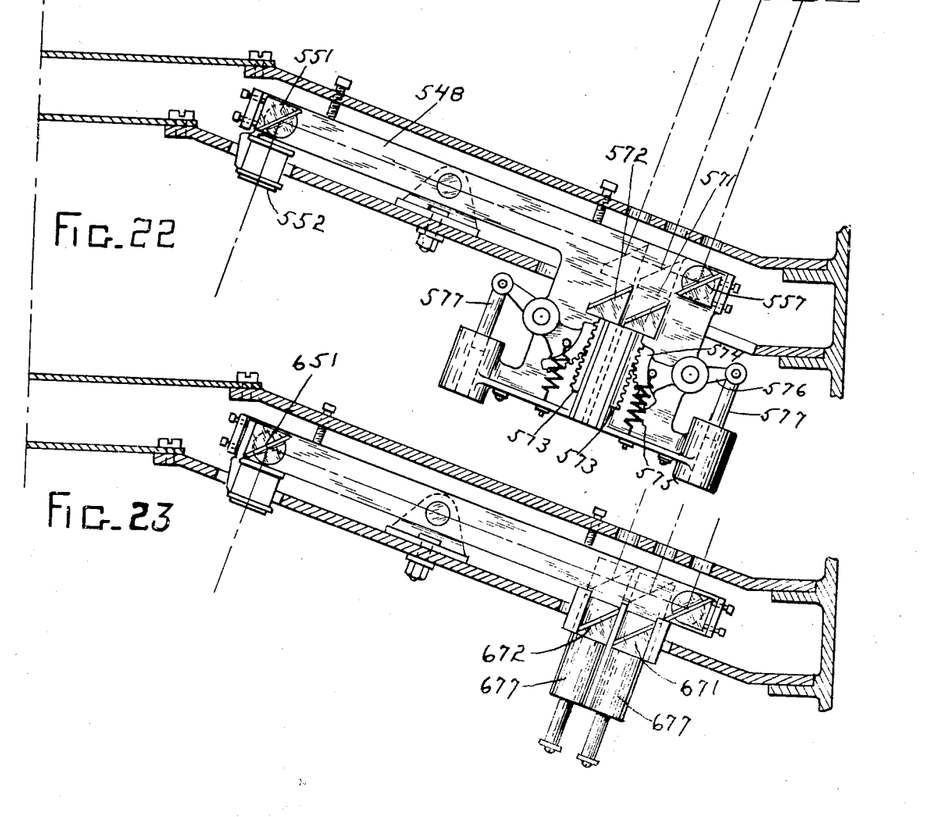

In Figure 22 is shown a modified arrangement of optical or projecting devices that may be employed when master character plates are used, having several series of characters of different sizes or fonts, such as described in connection with Figures 16 to 20. For simplification, in Figure 22, the shutter arrangement has been omitted and the details confined to the optical devices proper.

In said Figure 22, each set of optical or projecting devices for each set of like characters of the several series, comprises a pivotally mounted plate 548 corresponding to the plate 148, heretofore described, and adapted to be angularly adjusted in a similar manner. Said plate 548 is provided at its inner end with a relatively fixed mirror block 551 and an adjustable focusing lens 552. At its outer end, the plate is provided with another relatively fixed mirror block 557 adapted to co-act with the outermost series of shutters and characters, similar to the arrangement shown in Figures 5 and 6.

When either the intermediate or inner series of characters are to be projected, additional mirrors are employed as follows. The plate 548 is formed with a flange extension on which are slidably mounted an intermediate mirror block 571 and an inner mirror block 572. Said mirror blocks 571 and 572 are normally in the position shown in full lines in Figure 22, that is, retracted below the line of reflected light from the fixed mirror 557. Each mirror block 571—572 is provided with a rack 573 with which cooperates a segmental gear 574 normally held retracted by a spring 575. The segmental rack 574 is formed at one end of a first class lever 576, the outer arm of which is pivotally connected with a solenoid plunger 577. As will be apparent from Figure 22, the mirror blocks 571 and 572 are adapted to move in a line parallel to the light rays coming from the respective intermediate and inner circular series of characters as the light rays pass through the shutter openings. When any of the characters of the intermediate character series are to be photographed, the series of outermost solenoids 577 will all be energized upon actuation of the intermediate "series" key, heretofore referred to, thus projecting all of the series of mirror blocks 571 into operative position to reflect the light rays from the corresponding intermediate series of characters, to the fixed mirror block 551. Similarly, upon actuation of the inner "series" key, hereinbefore referred to, the innermost set of solenoids 577 will be energized, thereby projecting all of the inner series of mirror blocks 572 into operative position, as will be understood.

The modification shown in Figure 23 is similar to that shown in Figure 22, except that the intermediate and inner mirror blocks 671 and 672 are directly carried on solenoid plungers 677—677 which, upon energization, will project the respective series of mirror blocks 671 or 672, into operative position for reflecting the images to the fixed mirror block 651.

As will be evident to those skilled in the art, the constructions shown in Figures 16 to 20, 22 and 23, may all be employed in connection with a negative holding arrangement such as shown in Figures 1 to 4, and Figure 21, the film arrangement shown in Figure 11, the camera arrangement of Figure 14 and, further, that the shutter and optical devices may be operated or controlled pneumatically by manually actuated keys or by the automatic perforated roll arrangement hereinbefore referred to.

In the forms of the invention shown in Figures 16 to 20, 22 and 23, just described, it will be seen that the same characteristics are incorporated as previously pointed out in connection with Figures 4, 8 and 9, namely, the circular arrangement of the characters in a flat field combined with the circular arrangement and conical symmetrical disposition of the optical devices with reference to the line normal to the master character plate and passing through the center thereof, the like paths of travel of the transmitted images, and the uniform angular and symmetrical disposition of the last element of each optical device from which the images are transmitted relative to said normal line.

As will be further evident to those skilled in the art, the shutter arrangements hereinbefore shown and described are of relatively simplified character and merely illustrative. For certain classes of work requiring high speed, various other types of shutter mechanism may be employed similar to those employed in cameras wherein the shutters may be set for any fractional second exposures and with which may also be associated variable diaphragm opening controls and in this manner, the desired exposures, dependent upon the character of the sensitized films being used, automatically timed or controlled.

Although there has herein been shown and described what is now considered the preferred manner of carrying out the invention, the same is merely illustrative and not by way of limitation since it is evident that various other changes and modifications than those referred to, may be made without departing from the spirit of the invention. All changes and modifications are contemplated that come within the scope of the claims appended hereto.

What is claimed is:

1. An apparatus for photographically composing printing characters, comprising: means having thereon a font of printing characters, said characters being circularly arranged around a common center and disposed in a flat field; means to support a medium having a light sensitive coating thereon; a plurality of projectors correlated in number to the number of characters, means supporting said projectors in operatively and relatively fixed position relative to the respective characters and to a master-position located in a line which is normal to said flat field and extends through said common center, each of said projectors including a plurality of elements arranged to direct an image of a correlated character successively from one to the next and finally to said master-position, all of those elements of all of said projectors from which the images are respectively ultimately directed to said master position being disposed around and equi-distant from said normal line and also all uniformly angularly disposed relative to and equi-distant from said master-position; means for individually and selectively exposing said characters to project images onto a portion of said medium correlated to said master position; and means to effect shift of said medium relative to said master-position to present different portions of said medium to the same correlated position to be successively photographically impressed by the selected character images.

2. An apparatus for photographically composing printing characters comprising: means having thereon a plurality of printing characters circularly arranged around a common center and disposed in a flat field; a plurality of projectors correlated in number to the number of characters, means to support said projectors in operatively and relatively fixed position relative to the respective characters to transmit images of said characters to one master-position located in a line which is normal to said flat field and extends through said common center, each of said projectors including a focusing lens and a pair of mirrors cooperatively positioned to transmit an image successively from one to another and from the last thereof to said master-position; means to support said last transmitting elements of all of the projectors around and equi-distant from said normal line and also all uniformly angularly disposed relative to and equi-distant from said master-position; means to support a medium having thereon a light-sensitive coating at a position correlated to said master-position; means for individually and selectively exposing said characters to project images onto a portion of said medium correlated to said master-position; and means to effect shift of said medium to present different portions of said medium to the same correlated position to thereby be successively photographically impressed by the selected character images.

3. An apparatus in accordance with claim 2 wherein each projector also includes an individual plate, each said plate having the mirrors and lens of the corresponding projector mounted thereon, said plates being mounted on said supporting means; and means for adjusting each said plate on the supporting means.

4. In an apparatus for photographically composing printing characters, the combination of a plurality of different printing characters sufficient in number to constitute a font; means to support said characters all disposed in a circle and each at the same distance from a master focal position; a plurality of like projectors, one for each said character and independent of one another, to selectively optically project an image of each of said characters to said master position; means to support said projectors in front of said character supporting means in symmetrically and uniformly arranged position relative to said master focal position; means to support a medium having thereon a light sensitive coating, in a position to be photographically impressed by an image projected to said master focal position; means for individually and selectively exposing said characters to project images onto a portion of said medium correlated to said master-position; and means to effect shift of said medium to be successively photographically impressed by selected character images.

5. In an apparatus for photographically composing printing characters, the combination of a plurality of different printing characters sufficient in number to constitute a font; means to support said characters uniformly relative to a master focal position; a plurality of like projectors, correlated in number to the number of said characters and independent of one another to selectively optically project an image of each of said characters to said master position; means to support each of said projectors in front of said character support equi-distant from and symmetrically and uniformly angularly positioned relative to said master position; means to support a medium having thereon a light sensitive coating, with a portion thereof in a position correlated to said master focal position and to receive an image; means for individually and selectively exposing said characters to project images onto a portion of said medium correlated to said master-position; and means to effect shift of said medium for different portions thereof to be successively photographically impressed by selected character images.

6. In an apparatus for photographically composing printing characters, the combination of a plurality of different printing characters sufficient in number to constitute a font; means to support said characters uniformly relative to a master focal position; a plurality of projectors, correlated in number to the number of characters and independent of one another to selectively optically project an image of each of said characters to said master position, each of said projectors including a focusing lens with its axis extending in a direction to pass through said master position at the same angle as each of the others, all the lenses being equi-distant from said master position; means to support said projectors in front of said character support in a symmetrically and uniformly arranged position relative to said master focal position; means to support a medium having thereon a light sensitive coating, with a portion thereof, in a position correlated to said master focal position; means for individually and selectively exposing said characters to project images onto a portion of said medium correlated to said master-position; and means to effect shift of said medium for different portions thereof to be successively photographically impressed by selected character images.

7. In an apparatus for photographically composing printing characters, the combination of a plurality of different printing characters sufficient in number to constitute a font; means to support said characters uniformly relative to a master focal position; a plurality of projectors, correlated in number to the number of characters and independent of one another to selectively optically project an image of each of said characters to said master-position, each of said projectors including mirrors uniformly and equidistantly located with respect to said master-position; means to support said projectors in front of said character support in a symmetrically and uniformly arranged position relative to said master focal position; means to support a medium having thereon a light-sensitive coating, with a portion thereof in a position correlated to said master focal position; means for individually and selectively exposing said characters to project images onto a portion of said medium correlated to said master-position; and means to effect shift of said medium for different portions thereof to be successively photographically impressed by selected character images.

8. In an apparatus of the character described, the combination with a master character plate having a font of printing characters incorporated thereon, and all arranged in a circle in a flat field; of a circularly arranged series of projectors, one for each character, each said projector including an individual support and a lens and a pair of reflecting mirrors carried thereby, the mirrors and lens of each projector being so arranged that the image of a character first impinges on one mirror, is then reflected inwardly to the second mirror and from the latter through the lens; stationary means on which all of said individual projector supports are mounted, said projectors being so disposed that the axes of all the lenses converge to a common master position on a focal plane; and selectively operable means for exposing said characters to project images at said master position.

9. An apparatus for photographically composing printing characters in accordance with cam 8 wherein said last named means includes light intercepting shutters.

10. An apparatus for photographically composing printing characters comprising: means having thereon a plurality of printing characters aranged in a plurality of concentric circular series and all disposed in a flat field; a plurality of circularly arranged projectors corresponding in number to the number of characters in one of said series; means to support said projectors in operative position relative to the respective characters of said one series and to project an image of each of said characters to a master focal position located in a line which is normal to said flat field and extending through the common center; means to support a medium having thereon a light-sensitive coating at a position correlated to said master-position; means for adjusting each of said projectors to selectively cooperate with any corresponding character of any one of the circular series of characters and exposing the corresponding selected character of the selected series to project the image onto a portion of said medium correlated to said master-position; and means to effect shift of said medium to present different portions of said medium to the said correlated position to thereby be successively photographically impressed by the selected character images.

WILLIAM C. HUEBNER.